United States Patent [19]
Marischen et al.

[11] Patent Number: 5,351,653
[45] Date of Patent: Oct. 4, 1994

[54] ANIMAL TRAINING METHOD USING POSITIVE AND NEGATIVE AUDIO STIMULI

[75] Inventors: Joseph E. Marischen, Austin, Tex.; Peter L. Borchelt, Brooklyn, N.Y.

[73] Assignee: Canine Concepts, Incorporated, Austin, Tex.

[21] Appl. No.: 132,654

[22] Filed: Oct. 6, 1993

Related U.S. Application Data

[63] Continuation of Ser. No. 945,516, Sep. 16, 1992, abandoned.

[51] Int. Cl.⁵ ............................................. A01K 15/02
[52] U.S. Cl. .................................... 119/719; 119/905
[58] Field of Search ....................... 119/718, 719, 905; 340/573, 384 E

[56] References Cited

U.S. PATENT DOCUMENTS

| | | | |
|---|---|---|---|
| 3,364,478 | 1/1968 | Waard | 340/573 |
| 4,088,995 | 5/1978 | Paladino | 340/384 E |
| 4,180,013 | 12/1979 | Smith . | |
| 4,202,293 | 5/1980 | Gonda et al. . | |
| 4,335,682 | 6/1982 | Gonda et al. . | |
| 4,535,724 | 8/1985 | David . | |
| 4,539,937 | 9/1985 | Workman . | |
| 4,766,847 | 8/1988 | Venczel et al. . | |
| 4,780,706 | 10/1988 | Bollag | 340/573 |
| 4,785,433 | 11/1988 | Bush et al. . | |
| 4,802,482 | 2/1989 | Gonda et al. . | |
| 4,898,120 | 2/1990 | Brose . | |
| 4,947,795 | 8/1990 | Farkas . | |
| 4,965,552 | 10/1990 | Price et al. | 340/573 |
| 4,967,696 | 11/1990 | Tobias . | |
| 5,054,428 | 10/1991 | Farkus . | |
| 5,061,918 | 10/1991 | Hunter | 340/573 |

FOREIGN PATENT DOCUMENTS 2635946  3/1990  France .

OTHER PUBLICATIONS

J. K. Blackshaw et al., "Aversive Responses of Dogs to Ultrasonic, Sonic and Flashing Light Units", Applied Animal Behavior Science, 25 (1990) pp. 1–8.
"Pet Projects", The Sharper Image Catalog, Jun. 1992, p. 23.
"Barker Breaker", brochure by Amtek, San Diego, Calif. pp. 1–2, date unknown.
"Super Remote Barker Breaker", brochure by Amtek, San Diego, Calif., pp. 1–2, date unknown.
"Elexis Petcare Training", brochure by Elexis Corporation, Miami, Fla., p. 1, date unknown.
D. F. Tontora, Understanding Electronic Dog Training, published by Tri–Tronics, Inc., Tucson, Ariz. (1982).
Pet Agree, K-II Industries, Camillos, N.Y. pp. 1–2.

Primary Examiner—Paul J. Hirsch
Assistant Examiner—Todd E. Manahan
Attorney, Agent, or Firm—David M. Sigmond

[57] ABSTRACT

A method for training an animal capable of learning to associate a consistent positive audio tone with pleasant feelings. The method includes a consistent positive audio tone capable of being sensed by the animal without startling the animal, and a consistent negative audio tone distinct from the positive audio tone capable of being sensed by the animal and startling the animal. The invention enables a trainer to encourage good behavior by the animal by applying the positive audio tone after the animal has been trained to associate the positive audio tone with pleasant feelings, and to discourage bad behavior by the animal by applying the negative audio tone.

11 Claims, 2 Drawing Sheets

ANIMAL TRAINING METHOD USING POSITIVE AND NEGATIVE AUDIO STIMULI

CROSS-REFERENCE TO RELATED APPLICATIONS

This is a continuation of co-pending U.S. application Ser. No. 07/945,516 filed Sep. 16, 1992, now abandoned.

BACKGROUND OF THE INVENTION

1. Field of the Invention The present invention relates generally to the field of behavior modification of animals. More particularly, the present invention relates to an improved device and technique for controlling animal behavior by emitting a positive audio stimulus in conjunction with a negative audio stimulus for more effective training. The present invention also relates to using a hand-held electronic training device that provides consistent audio tones, both positive and negative, to aid in the training of domestic animals.

2. Description of the Related Art

Nearly every owner of the 100 million dogs and cats in the United States would like for their pet to be better trained but often can not afford to have it done, don't know how to do it themselves or won't spend the time. Moreover, most pets, at least some of the time, have difficulty understanding what their trainers expect of them. As a result the training process can be long and filled with error.

Shocking devices of various kinds are well known in animal training. For instance, cattle prods find use in navigating cattle traffic. Other shock devices are used to wean calves and train horses. U.S. Pat. No. 4,539,937 by Workman describes a horse training collar which delivers a controlled shock to the horse as it's neck muscles expand during cribbing. U.S. Pat. No. 4,947,497 by Farkas describes a dog barking collar that produces a low shock at the onset of barking which increases in intensity if the dog continues to bark in order to distinguish between "watchdog barking" and "nuisance barking." The obvious drawback to electrical shock treatment is that it is often considered repugnant and cruel.

Negative audio stimuli have been used as a more humane alternative for animal training. Many dog collars have been designed to emit an unpleasant sound in response to a dog's undesirable behavior. For instance, the "PeaceMaker" (trademark) dog collar by Humane Technology, Inc., College Station, Tex. produces a single high-intensity sound burst with a decrescendo pattern shortly after detecting the dog's bark while ignoring extraneous sounds of brief duration. U.S. Pat. No. 4,180,013 to Smith describes a collar which responds to barking by emitting a high frequency noise and mechanically vibrating the vocal cords of the dog. U.S. Pat. No. 5,061,918 to Hunter discloses a sound emitting collar which adjusts the sound intensity according to the previous behavior of the animal and also varies the sound pattern to avoid habituating the animal to the sounds.

Remote communication with animals is also known in the art. For example, U.S. Pat. No. 3,336,530 to Sloan et al. discloses a directional finding system for hunting dogs with a transmitter attached to a collar and a remote receiver which enables the trainer to locate the dog. U.S. Pat. No. 3,589,337 to Doss discloses a collar which administers a shock to a dog in response to a remotely transmitted signal. U.S. Pat. No. 4,202,293 to Gonda et al. discloses a dog collar with a sound emitting buzzer and shock terminals as well as a remote control which can activate the buzzer either alone or immediately followed by a light shock. U.S. Pat. No. 4,745,882 to Yarnall, Sr. et al. describes a device that administers a mild shock or unpleasant noise to a dog as it approaches the walls of a confined area. U.S. Pat. No. 4,766,847 to Venczel et al. also administers a shock to a dog as it approaches a predefined boundary but gradually increases the shock as the dog nears the boundary and continues the shock after the dog crosses the boundary. U.S. Pat. No. 4,967,696 to Tobias discloses a dog collar containing a receiver which emits a simple tone or a human voice upon being actuated by a remote transmitter. U.S. Pat. No. 5,054,428 to Farkus discloses a dog collar which can be actuated by a remote transmitter to apply a short duration shock to get the animal's attention and well as a more intense shock if the animal fails to conform to expected behavior.

The inherent disadvantage of the aforementioned prior art is that these devices provide only negative stimulation whereby the animal must either obey and respond properly or be punished. Positive feedback between the trainer and the animal is usually limited to voice and physical contact (petting) with neither being the primary means of training. It should be appreciated, however, that basic training theory centers on the animal learning signals for "YES" and "NO". These are most often taught through a series of rewards and punishments. Moreover, trainers often fail to effectively train their pets because they are not consistent in the positive reinforcement (reward) and punishment that they impose on the animal. For efficient and speedy training of animals it is usually necessary to deliver not only a consistent and immediate negative stimulus (NO command) but also a consistent and immediate positive stimulus (YES command).

Positive reinforcement devices which avoid resorting to injury or abuse are known in the field of animal training. U.S. Pat. No. 4,535,724 by David discloses a horse training apparatus mounted on a horse's neck which includes a storage tank filled a sweet liquid, a tube extending from the tank to the horse's mouth, a pump, a battery and a switch so that a trainer or rider can press the switch to pump sweet liquid into the horse's mouth. In addition a second identical set of equipment containing sour liquid can be mounted on the opposite side of the horse's neck so that the horse can be rewarded (sweet liquid) or punished (sour liquid). In the field of dog barking, U.S. Pat. No. 4,335,682 to Gonda et al. describes a dog collar which produces a first sound at commencement of a shock and a second sound when the shock is finished. A remote transmitter allows the user to generate the shock accompanied by the first sound when the shock begins and second sound when the shock ends, as well as the first sound alone or the second sound alone. In theory, the animal becomes conditioned to regard the first sound as a warning signal and the second sound invokes feelings of safety, relief and relaxation in the animal so that the trainer later can apply reward (second sound) and punishment (first sound) without the shock. A drawback to Gonda et al. is that the use of shock is mandatory in order to condition the dog.

The use of auditory stimuli in animal learning and training dates from before the classic works of Pavlov (1927) and Skinner (1938). See, for instance, I. P. Pavlov, *Conditioned reflexes,* London: Oxford University Press, 1927; and B. F. Skinner, *Behavior of Organisms,* New York: Appleton-Century-Crofts, 1938. In the subsequent years, auditory stimuli have been used as rewards, inhibitors and discriminitive stimuli in learning studies in a variety of species, including dogs and cats.

Another point to consider is the consistency of the level of the punishment. Most owners find it difficult to be consistent when disciplining their pet. Usually, too much of the owner's personal state of mind gets in the way. Furthermore, many of the previously discussed training devices by design administer inconsistent punishment. This inconsistency can confuse the animal and considerably lengthen training time.

Therefore, despite the availability of numerous positive reinforcement devices and punishment devices for behavior modification of animals, there is still a need for a humane training device that provides the consistent messages necessary to let the animal know when it is behaving correctly as well as incorrectly.

SUMMARY

The present invention is directed to using an improved animal training device which emits positive and negative audio stimuli to achieve more effective animal training.

An object of the present invention is to provide a safe and humane training aid to urge an animal, especially a dog or cat, to conform to desirable behavior without inflicting physical harm or pain to the animal.

Another object of the present invention is to allow an animal trainer to instantly dispense both reward or punishment, as the case may be, as the need for reward or punishment arises.

A further object of the present invention is to provide a behavior modification device which rapidly generates both a consistent positive audio signal and a consistent negative audio signal so as to be highly effective in a wide variety of animal training applications, including but not limited to house breaking, teaching dog commands such as "HEEL", "SIT" and "STAY", and eliminating unwanted cat behavior like scratching of furniture and jumping on counters.

According to the invention, a novel animal training device is provided which includes means for selectively emitting a first audio stimulus adapted to be sensed by the animal without startling the animal and means for selectively emitting a second audio stimulus distinct from the first audio stimulus adapted to be sensed by the animal and startle the animal.

A feature of the present invention is a method of modifying the behavior of an animal, comprising the steps of providing a device capable of emitting a first audio stimulus to be sensed by the animal without startling the animal and also capable of emitting a second audio stimulus distinct from the first audio stimulus to be sensed by the animal and startle the animal, generating the first audio stimulus by actuating the device while the animal is having a positive experience and senses the first audio stimulus thereby training the animal to associate the first audio stimulus with the positive experience, repeating the previous step until the animal responds positively to the first audio stimulus, then generating the first audio stimulus by actuating the device to reward the animal, and generating the second audio stimulus by actuating the device to punish the animal.

Advantageously, the present invention provides a user friendly, wireless electronic pet training device which is designed to fit the human hand so it can be pointed and operated accurately, quickly and easily to assist with home training of both dogs and cats. In one embodiment the hand-held unit may generate the tones; in another embodiment the hand-held unit may be a remote control unit with a transmitter and a separate collar attachable to the pet may generate the tones in response to signals transmitted by the remote control unit.

Another advantage is that when properly used the present invention allows for effective and expeditious training which can significantly reduce training time and help form a much closer bond between the pet and trainer.

A further advantage is the ability to train pets without negatively affecting the spirit and style of the animal.

Other objects, features and advantages of the invention will be better understood from the following detailed description and drawings that follow.

DETAILED DESCRIPTION OF THE PREFERRED EMBODIMENTS

Figure 1:
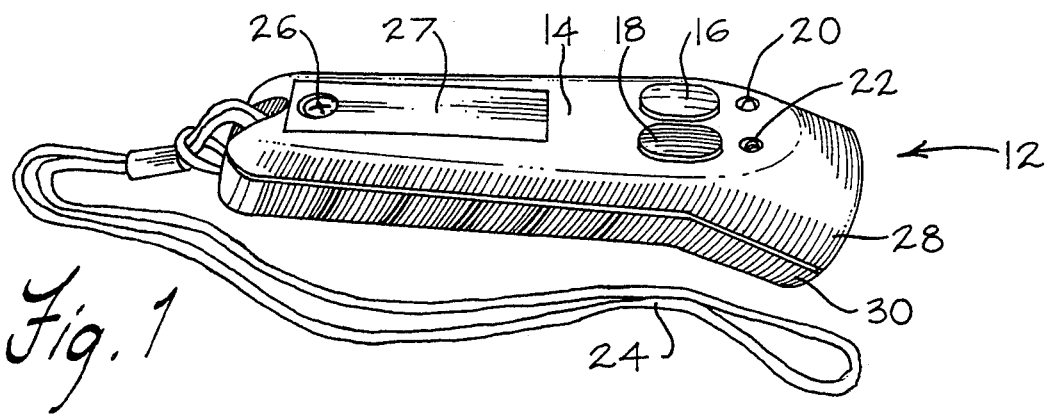
FIG. 1 is a perspective view of an animal training device constructed in accordance with one embodiment of the present invention.

Referring now to FIG. 1, in accordance with a first embodiment of the present invention there is shown a manually operable, portable hand-held unit 12 designed to be carried by a trainer and generate two characteristically different sounds to be utilized as positive and negative audio stimuli. Unit 12 includes a plastic case 14 containing the circuitry represented in block diagram form in FIG. 3. Two rubberized, color coded push-buttons shown as green button 16 and red button 18 are mounted inside case 14 and are accessible from the outside of case 14. The two push-buttons place two types of audio stimulation under the selective and direct control of a trainer at all times. Two light emitting diode (LED) indicator lights seen as green light 20 and red light 22 are also mounted inside case 14 and are visible from the outside of case 14. Wrist strap/lariat 24 is attached to case 14, and screw 26 is threadedly connected to case 14 so as to clamp battery door 27 on upper case section 28 to lower case section 30.

Figure 2:
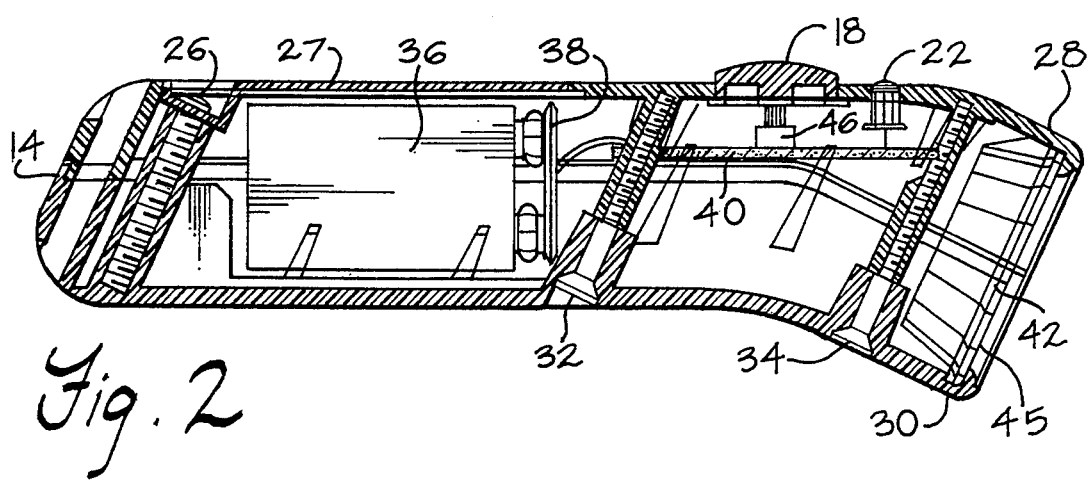
FIG. 2 is an elevational side view in cross-section of the device of FIG. 1.

Referring now to FIG. 2, there is shown an elevational side view in cross-section of the device of FIG. 1. As may be seen, case 14 also includes threadedly connected screws 32 and 34 which clamp case sections 28 and 30 together. Screws 32 and 34 are accessible from the outside of case 14 beneath lower case section 30. Enclosed in case 14 are a standard 9 volt alkaline battery 36 for supplying electrical power to the unit, a battery receptacle 38 mated to battery 36, a printed circuit board 40 which interconnects surface mounted electronic components (not shown), and a 1.5 inch diameter direct radiating ceramic tweeter 42 which serves as a loudspeaker to emit signals from the unit to the animal. Also attached to case 14 are metal mesh screen 45 to protect tweeter 42, red button 18 integral with second switch 46, and red light 22; directly behind them but not visible are green button 16, a first switch integral with green button 16, and green light 20, respectively.

Figure 3:
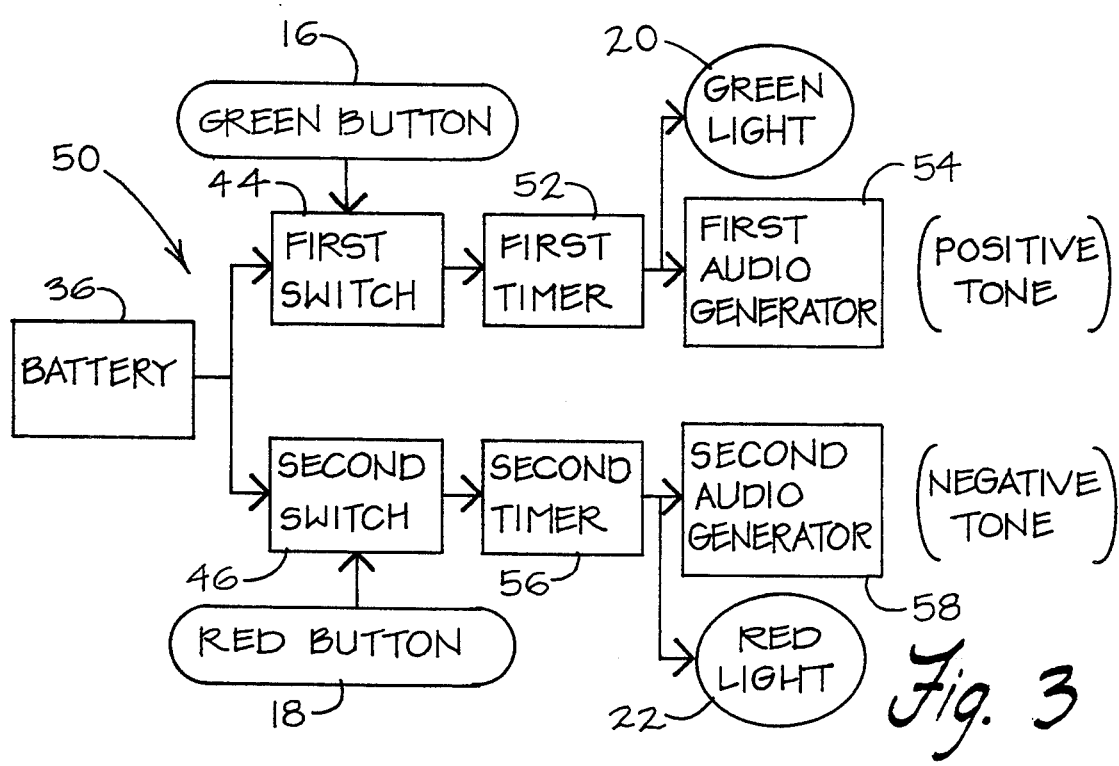
FIG. 3 is a block diagram generally illustrating the main components of the device of FIG. 1.

FIG. 3 is a block diagram generally illustrating the main components of the device of FIG. 1. Diagram 50 includes an electrical power source shown as battery 36 connected to two controls shown as first and second switches 44 and 46 manually operable by green and red push-buttons 16 and 18, respectively. The output of first switch 44 is connected to the input of a first timer 52. The output of first timer 52 is connected to a first visual display depicted as green light 20 and a first audio generator 54. Generator 54 provides first audio stimulation means for emitting a first (positive) tone. In parallel fashion, the output second switch 46 is connected to second timer 56 which in turn is connected to a second visual display depicted as red light 22 and a second audio generator 58. Generator 58 provides a second audio stimulation means for emitting a second (negative) tone. While optional, timers 52 and 56 are employed to prevent generating prolonged continuous tones which might be excessively annoying if not harmful to the animal. Furthermore, ceramic tweeter 42 of FIG. 2 may be a shared loudspeaker for generators 54 and 58 to further compact unit 12.

The operation of FIG. 3 shall now be described. When green button 16 is depressed, first switch 44 closes and activates first timer 52. Together, first switch 44 and first timer 52 provide an electrical path from battery 36 to green light 20 and first audio generator 52. The electrical power from battery 36 energizes and actuates green light 20 and first audio generator 52 and, as a result, green light 20 emits a green visible light while first audio generator 52 emits the first audio tone. Releasing green button 16 before first timer 52 expires serves to open switch 44 and disconnect timer 52, green light 20 and first audio generator 52 from battery 36. This causes timer 52 to reset and shuts off green light 20 and first audio generator 52, thereby eliminating the green visible light and the first audio tone. If on the other hand first timer 52 expires before green button 16 is released than timer 52 acts to disconnect green light 20 and first audio generator 52 from battery 36 until both switches are released, thereby automatically deactivating the green visible light and the first audio tone. The operation of the red button is similar. Depressing red button 18 closes second switch 46 and permits battery 36 to activate second timer 56, red light 22 and second audio generator 58 so that unit 12 emits red visible light along with the second audio tone until either red button 18 is released or second timer 56 expires, whichever comes sooner, at which time the red visible light and second audio tone are deactivated. In the event timer 56 expires then red light 22 and second audio generator 58 are turned off until both switches are opened. In other words, for both the green and red buttons, if the button is released before its respective timer expires than depressing the button immediately energizes its respective circuitry. However, if the respective timer has expired than continued depression of the button fails to activate its respective circuitry until both buttons are released.

Figure 4:
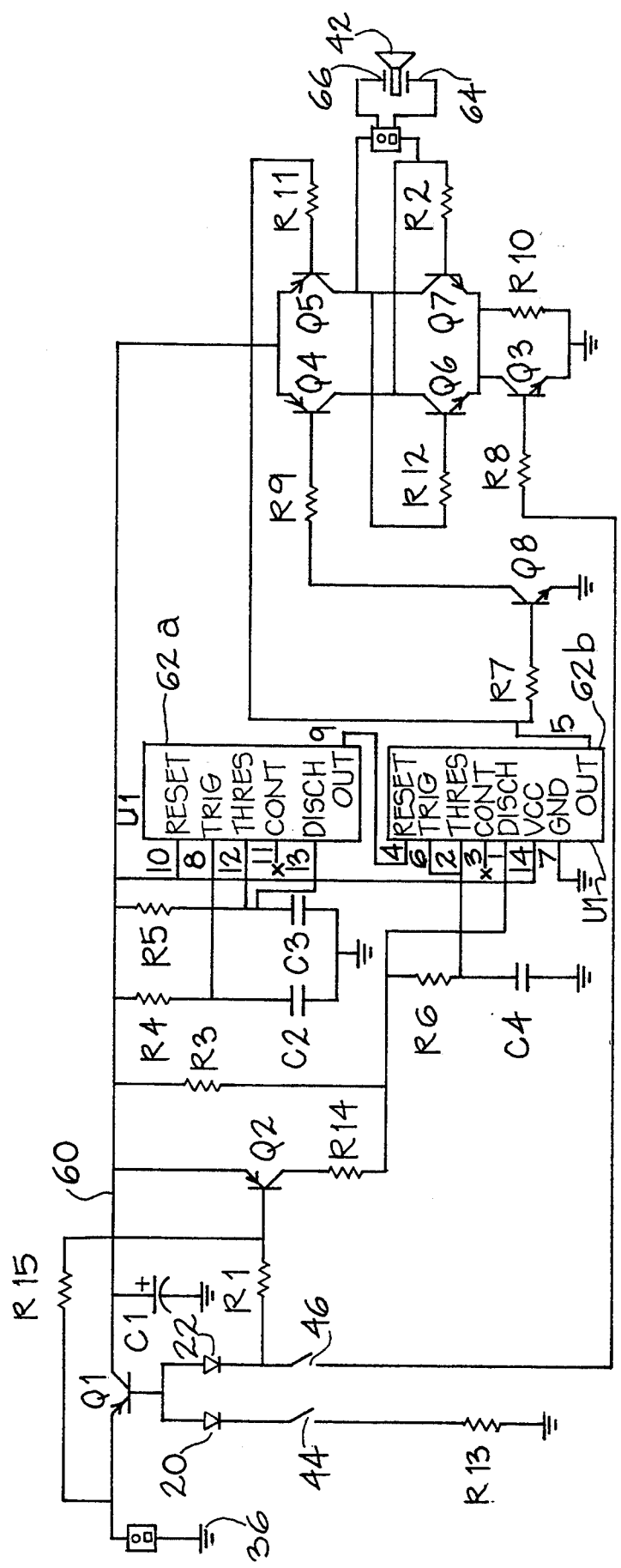
FIG. 4 is a schematic diagram illustrating one embodiment of the circuitry of FIG. 3.

With reference now to FIG. 4 a schematic diagram illustrates one embodiment of electronic circuitry which can implement the operation of FIG. 3. When either green button 16 or red button 18 is depressed, thus closing first switch 44 or second switch 46, respectively, the PNP transistor Q1 is saturated and supplies voltage from battery 36 along line 60 to the circuit. Capacitor C1 is a bulk electrolytic capacitor which filters noise on the circuit side of transistor Q1.

Pressing green button 16 closes first switch 44 and lights green LED 20. Resistor R13 limits the current through green LED 20. Transistor Q3, the volume control transistor, remains off, which keeps resistor R10 at a voltage level between the emitters of transistors Q6 and Q7 and ground. As a result, resistor R10 limits the sound intensity of the positive audio tone to a level that is not startling to the animal. The combination of pullup resistor R3, resistor R6 and timing capacitor C4 determine the frequency of the positive tone. In addition, resistor R15 ensures that transistor Q2 stays off during this operation. This is important since without resistor R15 transistor Q2 may conduct when red LED 22 is exposed to sunlight so as to cause noticeable variations in the frequency of the positive tone.

Pressing red button 18, on the other hand, closes second switch 46 to light red LED 22 and saturate transistors Q2 and Q3. Resistor R8, the base resistor of transistor Q3, limits the current through the base-to-emitter junction of transistor Q3 as well as through red LED 22. Resistor R1, the base resistor of transistor Q2, limits the current through the base-to-emitter junction of transistor Q2, but allows enough base current to saturate transistor Q2. When transistor Q2 is saturated, resistor R3 is shunted by transistor Q2 and resistor R14. That is, resistor R3 is in parallel with the series combination of resistor R14 and the VCE(SAT) of transistor Q2. The resistor R3/resistor R14/transistor Q2 combination taken in series with the series combination of R6 and timing capacitor C4 determines the frequency of the negative tone. Furthermore, the saturation of transistor Q3 allows the emitters of transistors Q6 and Q7 to be a single VCE(SAT) level above ground, thereby applying a large voltage swing at tweeter 42 which generates a loud (startling) negative tone.

The timing function is performed by a dual low-power CMOS timer U1. One half of the dual timer is configured as a monostable oscillator 62a. A simple resistor R4 and capacitor C2 combination provides a trigger pulse to reliably start monostable oscillator 62a. The output of monostable oscillator 62a controls the reset input of the other half of dual timer U1, which is configured as an astable oscillator 62b used to generate both the positive and negative tones. The output of monostable oscillator 62a, as controlled by resistor R5 and capacitor C3, remains high for approximately one second, allowing the astable oscillator 62b to oscillate, before going low and to prevent further oscillation from astable oscillator 62b. After monostable oscillator 62a times out, its output remains low until first, both switches 44 and 46 are opened, and then secondly, either switch 44 or switch 46 is closed.

The output of astable oscillator 62b is connected to a four transistor push-pull amplifier circuit. When the output of astable oscillator 62b is high, transistors Q4 and Q8 become saturated with resistor R9 limiting the current from the base of transistor Q4 into the collector of transistor Q8 and resistor R7 limiting the current into the base of transistor Q8. When transistor Q4 saturates, tweeter lead 64 is driven to within two VCE(SAT) levels of the battery voltage. In addition, transistor Q7 is also driven into saturation by the voltage through base resistor R2. As a result, tweeter lead 66 is given a path to ground through the series combination of saturated transistor Q7 and resistor R10 and the positive tone is generated. The negative tone, on the other hand, is generated when tweeter lead 66 is given a path to ground through the series combination of saturated transistors Q7 and Q3.

When the output of astable oscillator 62b is low, transistor Q8 is turned off and transistor Q5 is driven into saturation. Resistor R11 is used to limit the base current out of transistor Q5 into the low output of astable oscillator 62b. When transistor Q5 is saturated, tweeter lead 66 is driven within two VCE(SAT) levels of the battery voltage. Transistor Q6 is also driven into saturation by this voltage through the base resistor R12. Tweeter lead 64 is now given a path to ground through the series combination of saturated transistor Q7 and resistor R10 to produce the positive tone, or through the series combination of saturated transistors Q3 and Q7 to produce the negative tone.

Thus, when switch 44 or switch 46 is closed, monostable oscillator 62a commands astable oscillator 62b to produce an oscillating output which is amplified and applied to tweeter 42 which generates sound. The frequency and amplitude of the oscillating voltage across tweeter 42, and hence the frequency and volume of the positive or negative tone, depends on whether switch 44 or switch 46 is closed. Furthermore, monostable oscillator 62a automatically shuts off astable oscillator 62b to silence tweeter 42 after either tone exceeds one second duration.

While it will be understood that the solid state electronic circuitry of FIG. 4 may be varied, and the values of different components can be changed, we will, in order to assure a full disclosure of the invention, set forth below types of transistors, capacitor and resistor values, and other specific electronic components which may be employed in a typical circuit connected as shown in FIG. 4.

| The Component | Type or Value |
| --- | --- |
| Transistor Q1 | Type 2N4403 |
| Transistor Q2 | Type 2N4403 |
| Transistor Q3 | Type PN2222 |
| Transistor Q4 | Type 2N4403 |
| Transistor Q5 | Type 2N4403 |
| Transistor Q6 | Type PN2222 |
| Transistor Q7 | Type PN2222 |
| Transistor Q8 | Type PN2222 |
| Capacitor C1 | 10 microfarad |
| Capacitor C2 | 4700 picofarad |
| Capacitor C3 | .68 microfarad, 10% |
| Capacitor C4 | 2200 picofarad, 5% |
| Resistor R1 | 8.2K |
| Resistor R2 | none |
| Resistor R3 | 1.2M |
| Resistor R4 | 470K |
| Resistor R5 | 1.5M |
| Resistor R6 | 10K, 1% |
| Resistor R7 | 8.2K |
| Resistor R8 | 270 |
| Resistor R9 | 560 |
| Resistor R10 | 3.9K |
| Resistor R11 | 560 |
| Resistor R12 | 100 |
| Resistor R13 | 270 |
| Resistor R14 | 10K, 1% |
| Resistor R15 | 2.2M |
| Multivibrator U1 | GLC556 |
| (Monostable multivibrator 62a | 1/2 GLC556) |
| (Astable multivibrator 62b | 1/2 GLC556) |
| Green switch 44 | KPT-1102 |
| Red switch 46 | KPT-1102 |

-continued

| The Component | Type or Value |
| --- | --- |
| Green LED 20 | LTL-307G-071 |
| Red LED 22 | LTL-307E-071 |
| Tweeter 42 | KSN1075A |
| Battery 36 | 9 V alkaline |

In the previously described embodiments, the device of the present invention has consisted of a portable hand-held sound emitting unit controlled by a trainer and physically separated from the animal. This, however, need not necessarily be the case. In particular, the present invention is especially well suited for use as a remote transmitter unit and a collar adapted to be worn by the animal wherein the collar, as opposed to the unit, emits the positive and negative audio tones. That is, the user operable unit may be a remote control unit which further includes a radio frequency (RF) transmitter for transmitting a first signal in response to actuation of the first control means and a second signal in response to actuation of the second control means, and the collar may include a receiver for selectively receiving the first and second signals to actuate the positive and negative audio tones in response to the first and second signals, respectively. The collar may further include attaching means for attachment to the animal and a power source for supplying electrical power to the audio stimulation means.

The details of animal training devices which include a remote control unit and a sound generating animal collar responsive thereto are known in the art and therefore need not be repeated herein. The details of such devices are set forth in U.S. Pat. Nos. 4,967,696; 4,335,682; and 4,202,293 which are incorporated herein by reference. By combining the teachings of the present invention as set forth herein with these incorporated patents, one skilled in the art could readily adapt the teachings of the present invention into a remote control unit and remotely controlled sound-generating animal collar device.

Whether a collar is employed or not, with regard to the difference between the manner of actuation of the circuitry when the red and green buttons are pressed it is noted that the first and second tones are distinct from one another. The first tone is a positive tone at a consistent predetermined frequency that is audible to the animal and of sufficient duration and intensity to be sensed by the animal without startling the animal when the animal is within a range of distances from the device. The second tone, on the other hand, is a negative tone having a consistent predetermined frequency distinct from that of the first audio tone and a greater intensity than that of the first audio tone wherein the second audio tone is audible to the animal and of sufficient duration and intensity to be sensed by the animal and startle the animal so as to aversively stimulate and irritate the animal without being harmful to the animal when the animal is within the same range of distances from the device. The positive tone is a softer, more pleasant sound that enables a trainer to communicate approval to the animal and encourage good behavior by the animal, whereas the negative tone enables the trainer to communicate disapproval to the animal and discourage bad behavior by the animal.

The second tone is inherently irritating and aversive to the animal and, therefore, does not require the animal to be trained in order to negatively effect the animal. It is critical to note, however, that the first tone is not an inherently positive or pleasant tone for the animal. While the first tone must not startle the animal, the animal must nonetheless be trained to associate pleasant feelings with the first tone. Therefore, the animal must be capable of being trained to associate the first tone with positive reinforcement so that the first tone alone can later be used to encourage good behavior by the animal. This is best accomplished by rewarding the animal in the presence of the first tone, such as by feeding or petting the animal. However, the cessation of a negative experience such as silencing the second tone can also provide reinforcement for the animal. In either case, the association step is normally repeated several times before the animal responds positively to the first tone alone. If the training is successful, the animal shall associate a pleasant feeling with the first tone. That is, the animal is conditioned to recognize the first tone as an indication of approval and the like. At this point, the present invention device can be used to reward or signal YES to the animal by depressing the green button, and to punish or signal NO to the animal by depressing the red button. In addition, it is preferable to repeat the association step after the animal responds positively to the first audio tone in order to reinforce the animal's training.

By way of example with a dog or a cat, a low frequency, low volume "GOOD" tone at 480 Hz and 80 db may be used to encourage good behavior whereas a brief, high volume burst of "BAD" tone using 16.7 KHz at 110-115 db for one second may be used to discourage bad behavior. (These happen to be the tones produced by the circuitry of FIG. 4 with the types and values of components listed.) Of course other sound frequencies and intensities are also suitable. Preferably, the GOOD tone is non-startling to humans as well, and the BAD tone is at sufficiently high frequency to be inaudible to most or all humans but well within the hearing range of dogs and cats. In addition, while the BAD tone must be irritating to the animal it should not be loud enough or emitted close enough to the animal's ears to harm the animal. What is imperative is that the animal find the GOOD tone non-startling and the BAD tone startling. With the GOOD and BAD tones specified above, the preferred range of distances for a dog or a cat is between 1-20 feet from the device, although greater distances such as 50 feet are usually acceptable. Training is most effective when the tones are generated immediately, or at least within a few seconds after the animal displays a desirable or undesirable behavior in order to avoid confusing the animal. Furthermore, the trainer may reinforce the negative tone with a deep, loud, short sound (like "HEY" or "HO") and reinforce the positive tone with a soft, gentle sound (like "GOOD DOG" or "THAT A BOY").

Finally, as mentioned above, in order to protect the pet from prolonged continuous tones which may become unduely irritating or harmful to the animal the maximum continuous duration of the tones should be limited. This is best accomplished by including some kind of timer circuitry in the device, such as timers 52 and 56, which deactivates the positive and negative tones after a predetermined time period. For example, after the positive or negative tone is generated continuously for one second, unit 12 automatically terminates the tone.

The present invention, therefore, is well adapted to carry out the objects and attain the ends and advantages mentioned as well as others inherent therein. While presently preferred embodiments of the invention have been given for the purpose of disclosure, numerous changes in the components, materials, arrangement of parts, and steps in the process may be made without departing from the spirit of the present invention and the scope of the appended claims.

We claim:

1. A method of modifying the behavior of an animal without inflicting physical ham or pain to the animal, comprising the steps of:

providing a device capable of emitting a first audio stimulus always at a constant frequency to be sensed by the animal without startling the animal and also capable of emitting a second audio stimulus always at a constant frequency distinct from the first audio stimulus to be sensed by the animal and startle the animal;

generating only the first audio stimulus by actuating the device while the animal is having a positive experience and senses the first audio stimulus thereby training the animal to associate the first audio stimulus with the positive experience without requiring any specific behavior by the animal;

repeating the previous step until the animal responds positively to the first audio stimulus alone; then generating only the first audio stimulus by actuating the device to reward the animal using the first audio stimulus alone; and generating the second audio stimulus by actuating the device to punish the animal using the second audio stimulus alone.

2. The method of claim 1 wherein the positive experience is a reward.

3. The method of claim 2 wherein the reward is feeding the animal.

4. The method of claim 2 wherein the reward is petting the animal.

5. The method of claim 1 wherein the positive experience is the cessation of a harmless negative experience.

6. The method of claim 5 wherein the harmless negative experience is provided by actuating the device to emit the second audio stimulus.

7. A method for training a domestic animal, which includes administering YES and NO commands without inflicting physical harm or pain to the animal, comprising the steps of:

providing a device which can generate a consistent first audio tone at a first constant frequency and intensity known to be audible to the animal but not startling to the animal when the first audio tone is sensed by the animal at a distance from the device, wherein the device can also generate a consistent second audio tone distinct from the first audio tone at a second constant frequency and intensity known to be audible to the animal and startling to the animal when the second audio tone is sensed by the animal a distance from the device;

positioning the device at the distance from the animal;

generating only the first audio tone at said first constant frequency by actuating the device while the animal is having a positive experience and is able to sense the first audio tone such that the animal associates the first audio tone with the positive experience without requiring any specific behavior by the animal;

repeating the association stop until the animal responds positively to the first audio tone alone; then generating only the first audio tone at said first constant frequency by actuating the device while the animal engages in good behavior and is able to sense the first audio tone after the animal responds positively to the first audio tone alone thereby pleasantly stimulating the animal and encouraging the animal to continue performing the good behavior using the first audio tone alone; and generating the second audio tone at said second constant frequency by actuating the device while the animal engages in bad behavior and is able to sense the second audio tone thereby aversively stimulating the animal and discouraging the animal from continuing to perform the bad behavior using the second audio tone alone.

8. The method of claim 7 wherein the device is designed for portable hand-held operation without any physical attachment to the animal during normal operation of the device.

9. The method of claim 7 wherein the distance is in the range of 1–50 feet.

10. The method of claim 7, further comprising repeating the association step after the animal responds positively to the first audio tone alone so as to provide reinforcement for the animal's associating the first audio tone with a positive experience.

11. The method of claim 7, further comprising reinforcing at least one of the tones with verbal instructions from a trainer.

* * * * *

UNITED STATES PATENT AND TRADEMARK OFFICE
CERTIFICATE OF CORRECTION

PATENT NO. : 5,351,653

DATED : October 4, 1994

INVENTOR(S) : Marischen et al

It is certified that error appears in the above-indentified patent and that said Letters Patent is hereby corrected as shown below:

Column 2, line 42, after "filled" insert -- with --.

Column 5, lines 33, 35, 37, 40, 42, and 46, change "52" to -- 54 --.

Column 10, line 10, change "ham" to -- harm --.

Column 10, line 58, change "a" before "distance" to -- the --.

Column 11, line 1, change "stop" to -- step --.

Signed and Sealed this

Fourteenth Day of February, 1995

Attest:

BRUCE LEHMAN

Attesting Officer  Commissioner of Patents and Trademarks